United States Patent [19]

Kellner

[11] 4,213,686

[45] Jul. 22, 1980

[54] CLOSEUP FOCUSING MECHANISM FOR AN OBJECTIVE OF LONG FOCAL LENGTH

[76] Inventor: Ferdinand Kellner, Spittelmüllerstr. 6, 8940 Memmingen, Fed. Rep. of Germany

[21] Appl. No.: 57,077

[22] Filed: Jul. 12, 1979

[30] Foreign Application Priority Data

Jul. 25, 1978 [DE] Fed. Rep. of Germany ....... 2832522

[51] Int. Cl.² .................. G03B 17/00; G03B 13/02
[52] U.S. Cl. ................................ 354/195; 354/286
[58] Field of Search ............. 354/195, 196, 198, 200, 354/202, 286

[56] References Cited

U.S. PATENT DOCUMENTS

| | | | |
|---|---|---|---|
| 1,637,529 | 8/1927 | Mitchell | 354/200 |
| 3,045,550 | 7/1962 | Kellner | 354/286 X |

FOREIGN PATENT DOCUMENTS

| | | | |
|---|---|---|---|
| 1033503 | 7/1958 | Fed. Rep. of Germany | 354/195 |
| 1217197 | 5/1966 | Fed. Rep. of Germany | 354/195 |
| 1280659 | 10/1968 | Fed. Rep. of Germany | 354/195 |
| 325486 | 12/1957 | Switzerland | 354/195 |

Primary Examiner—Donald A. Griffin
Attorney, Agent, or Firm—Holman & Stern

[57] ABSTRACT

In a closeup focusing mechanism for objectives of long focal length, a tube carried between the objective housing and a camera mounting means telescopes into and out of the objective housing. The camera mounting means carries an axially extending rod externally of the tube which is guided in a guide carried by the objective housing. Thus the tube does not rotate relative to the housing.

4 Claims, 5 Drawing Figures

CLOSEUP FOCUSING MECHANISM FOR AN OBJECTIVE OF LONG FOCAL LENGTH

BACKGROUND OF THE INVENTION

The invention concerns a camera closeup focusing mechanism for objectives of long focal length, comprising a tube between the objective housing and a mounting means for the camera, as well as anti-rotation means.

Telephoto objectives, objectives of long focal length, as a rule have focusing ranges of infinity to about 7 meters. However it is often desirable, when photographing birds and similar subjects, to be able to focus sharply at a distance of from two to three meters. This is achieved by inserting a closeup focusing mechanism between the objective housing and the mounting means for the camera.

The design of a closeup focusing mechanism in the form of a tube is already known. There is a certain minimum inner diameter which the tube must have, and should exceed, depending on the format and dimensions of the objective, in order to avoid underexposure of the border regions of the photograph.

At the same time the outer diameter of the tube imposes a limit on the dimensions of the objective and/or its fine-focusing mechanism. If the outer diameter of the tube is increased, all the dimensions of the objective must be modified. It is clear that the outer diameter of the tube is limited by these conditions Known closeup focusing mechanisms use a tube which has the maximum possible thickness taking into account the above conditions. Grooves are machined into this tube in order to supply the required guiding means between the camera on the one side and the telephoto objective on the other.

Such guides or guide grooves are necessary in order to have means of transmitting rotational forces between the camera and the objective. This is a factor, for example, when the camera is being turned between vertical and horizontal formats, or in the attaching of the objective to the camera.

Cameras currently used for long-focal-length objectives, in particular, have substantial size and weight, typically with, for example, motorized film transports, etc. Also the weight of the telephoto objective itself is relatively high. The tube thus must form a connection between relatively heavy parts.

Since however the tube wall should be kept as thin as possible, the guide grooves in the tube must be kept small. The guides, grooves and the like are therefore subject to relatively high stresses. If the transmission and accommodation of these stresses is unsatisfactory, the guides can be overloaded, and there is danger of sudden or rapid wear. The useful life of the tube with guides therefore tends to be less than that of other parts of the camera or the telephoto objective.

An object of the present invention is to provide a closeup focusing mechanism for objectives with long focal lengths, which mechanism has a relatively high load-carrying capability and does not develop appreciable evidence of wear after long use. A further object of the invention is to provide a device which does not require an increase in the dimensions of the telephoto objective, particularly its diameter; but rather, such a closeup focusing mechanism should be usable with available telephoto objectives.

SUMMARY OF THE INVENTION

The present invention provides a closeup focusing mechanism for long-focal-length objectives, comprising a tube between the objective housing and the mounting means for the camera, which tube can be pushed or slid into and pulled out of the objective housing with prevention of rotation between the camera mounting means and the objective housing.

In accordance with the invention, it is proposed that the tube be manufactured from thin walled material, and that external to the tube there be a guide rod attached to the camera mounting means, which rod works in concert with a guide on the objective housing.

The invention employs a relatively thin walled tube but in an arrangement whereby it need not sustain any rotational stresses. It is therefore unnecessary to have grooves or other guide means on this tube. It is sufficient for the tube to be guided telescopically to ensure that the optical axis of the camera is directed in the direction of the optical axis of the telephoto objective. The forces involved in directing these parts can be transmitted by such a relatively thin walled tube substantially without damage or wear phenomena developing. One need only supply certain necessary elements, e.g., features of the camera mounting, or detent means, so as to prevent the tube from being pulled out of the objective housing. There is no particular problem in accommodating these parts with a thin walled tube of the type proposed. The invention thereby achieves a relatively large inner diameter for light beam passage without the diameter of the objective being increased.

The guide rod can be mounted so as not to affect the other parts of the objective, etc. The rod can for example be attached to the camera mount or mounting ring and work together with a guide on the objective housing. One guide rod suffices, since rotation is prevented by the combination of guide rod on one side and the tube on the other. The guide rod and guide are simple elements which can be manufactured at modest cost.

In its fixed position the guide rod is capable of bearing the entire stress of holding the assembly in place, thus substantially relieving the stress on the tube and its own telescoping guides, which contributes greatly to the operating life of the assembly.

It is further advantageous for the fixing of the guide rod to be effected by means of a set screw in the guide.

There is a wide choice of location of the guide rod. However, it is advantageous for the rod to be located in the angular section neighboring the attachment location of the holding grip or operating grip to the objective housing. In this way the guide rod fits into the outer contour of the telephoto objective and does not take up a great deal of additional space, which can become important when the apparatus is being carried or shipped. It is also important during use, where there are no projecting parts to interfere with manipulation.

It is further proposed that the set screw be on one side of the grip and the guide rod on the other, which yields a compact design.

DESCRIPTION OF PREFERRED EMBODIMENT

Figure 4:
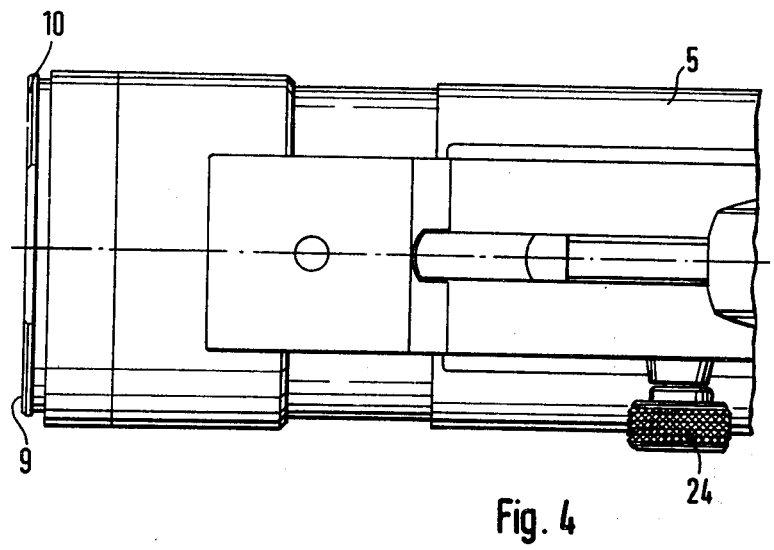
FIG. 4 shows the adjoining part of the objective of FIG. 3.
Figure 5:
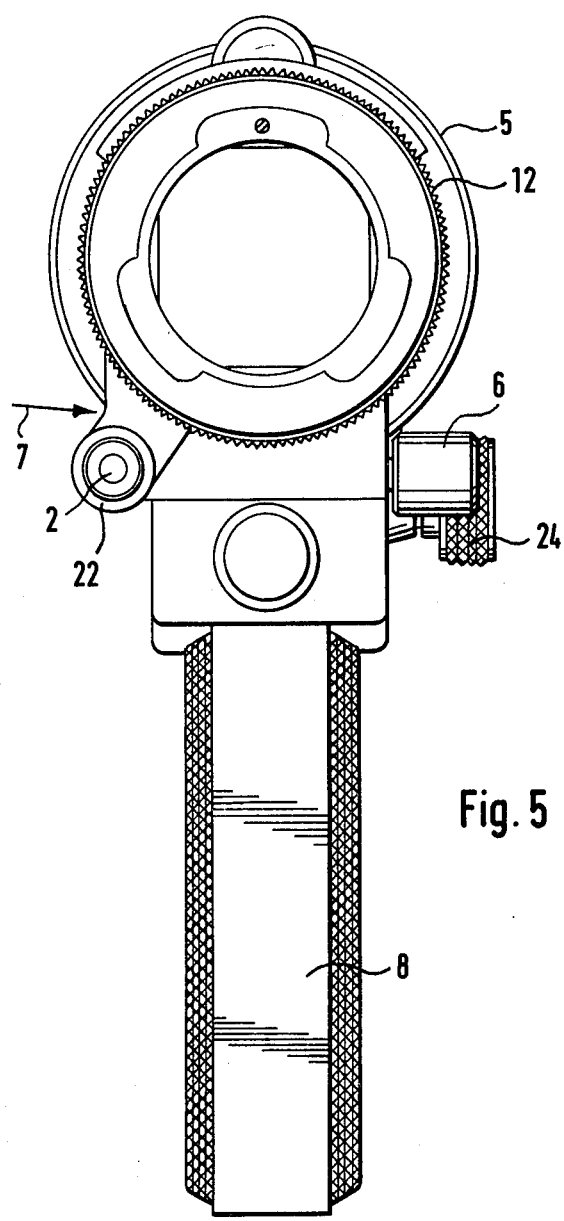
FIG. 5 is a rear view of the objective of FIG. 1.

The objective shown in the drawings is a piece which is constructed unitarily with objective housing 5. Another objective part attaches on at the front end 9 (see FIG. 4) of this first objective part, via bayonet mount 10, when the objective is in the operating mode. This front part of the objective is not shown further.

The associated camera is also omitted from the drawings. This camera can be attached, for example, on mounting ring 11, which is held by nut 12 to camera mount 3. The film plane of the camera is signified by 13 in FIG. 2.

The part of the objective shown in the drawing comprises basically the objective housing 5 which is rigidly connected to the grip 8. The tube 15 is moved in objective housing 5 for fine focusing by means of the movable part 14 of the grip. Tube 15 is supported in objective housing 5 by means of, for example, bearing 16. The guide tube 17 for tube 1 is attached at the rear end area of objective housing 5. A suitable coating 18 is provided on the inside of said guide tube 17 in order to ensure that tube 1 is easily slidable in guide tube 17.

The outer end of tube 1 supports the camera mount 3 and may be permanently joined to these parts. There may also be compartment 19 for filters or similar devices.

Figure 1:
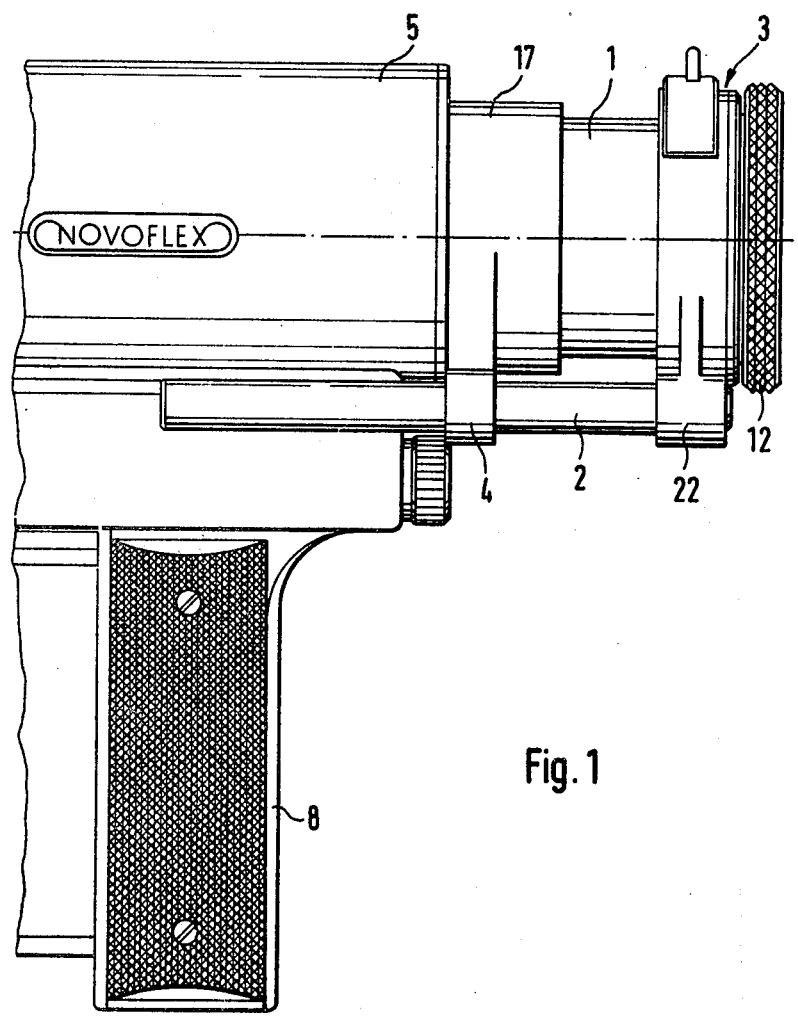
FIG. 1 is an elevation showing the rear part of a long-focal-length objective with a closeup focusing mechanism according to the invention.
Figure 2:
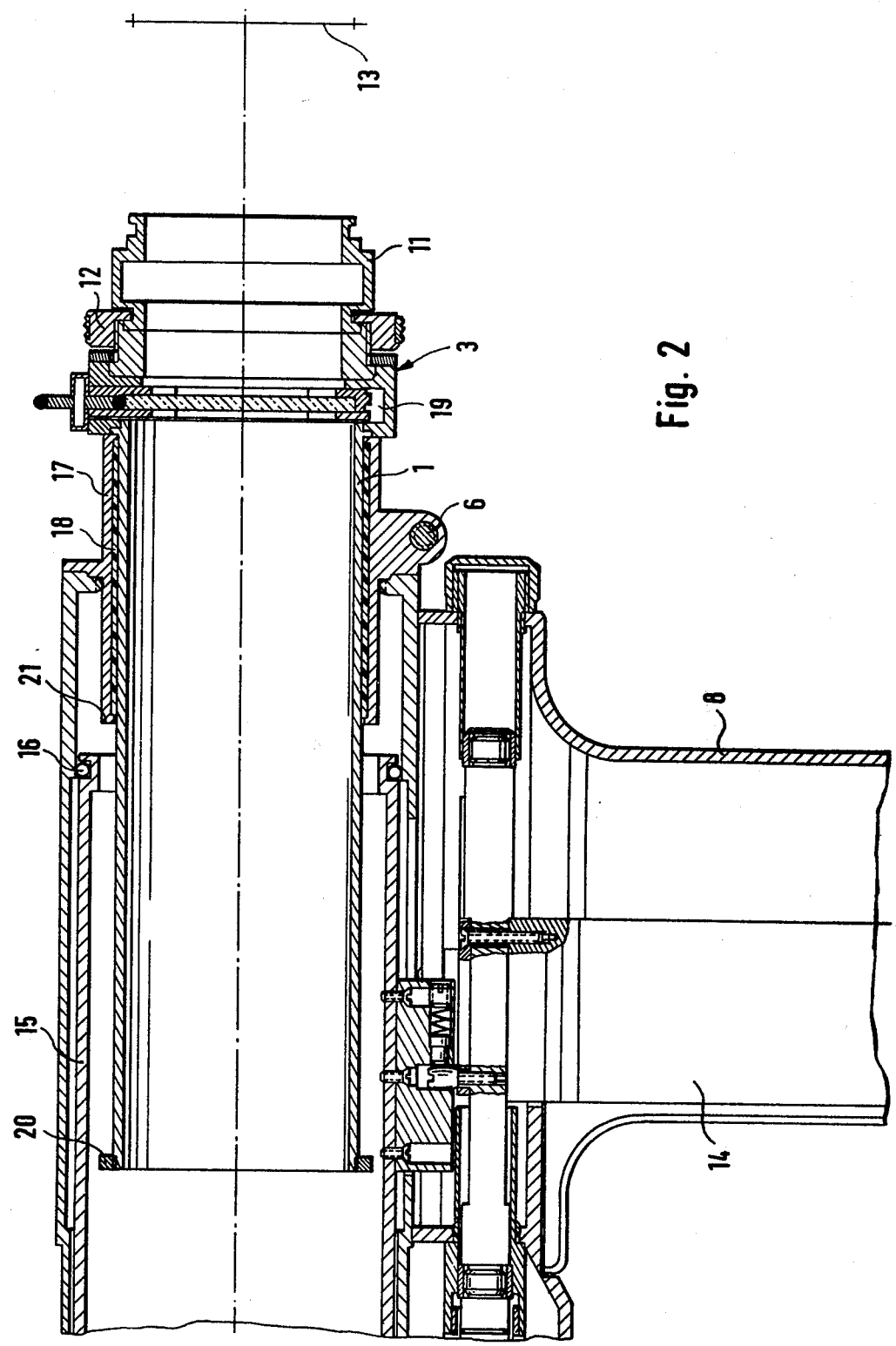
FIG. 2 is a partial cross section of the above type of objective and closeup focusing mechanism.
Figure 3:
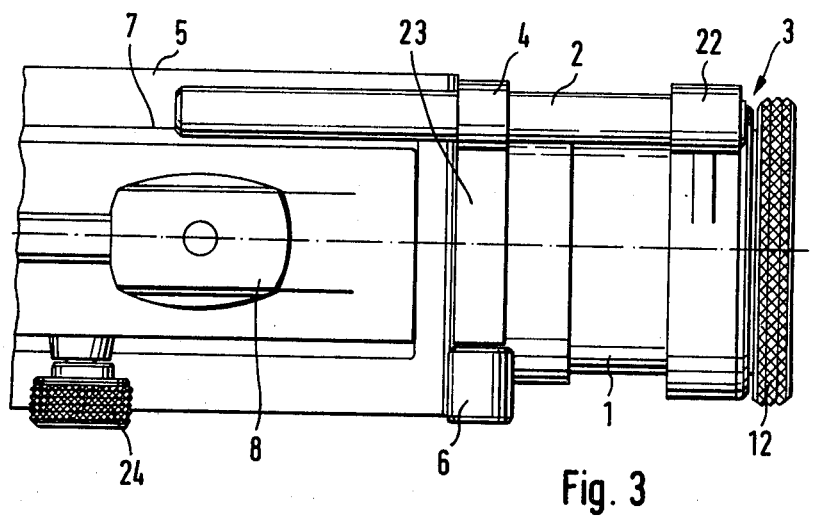
FIG. 3 is a bottom view of the rear part of the objective of FIG. 1.

FIG. 2 shows the position in which tube 1 is fully slid into the objective housing 5. FIGS. 1 and 3 show a position where the tube is partly pulled out. A detent ring 20 is provided on the inner end of tube 1 to prevent undesired pulling out of said tube from the guide tube 17. At the maximum pulled-out position, detent 20 contacts the inner end 21 of guide tube 17.

A guide rod 2 is attached in a boss 22 on the camera mount 3. This guide rod is guided in guide 4 which is attached to guide tube 17. The arrangement places the guide rod in angular region 7 relative to grip 8 as attached to objective housing 5. A set screw 6, which is located on the other side of grip 8, is partially enclosed in part 23. It clamps by tightly engaging guide rod 2 in guide 4, at the desired extended position of tube 1. As seen clearly in FIG. 3, there is also an adjusting device 24 for fixing the fine-focusing setting of the objective.

What is claimed is:

1. A closeup focusing mechanism for a long-focal-length objective comprising an objective housing, means for mounting the objective to a camera, a tube between the objective housing and the camera mounting means, the tube being slidable into and out of the objective housing, a guide rod attached to the camera mounting means and extending towards the objective housing externally of the tube, and a guide for said rod on the objective housing.

2. A closeup focusing mechanism according to claim 1 including a set screw for fixing the guide rod in the guide.

3. A closeup focusing mechanism according to claim 2 and including an operating grip associated with said housing, said set screw being located on one side of said grip and said guide rod and guide being located on the other side of said grip.

4. A closeup focusing mechanism according to claim 1 or claim 2 including an operating grip associated with said housing and the guide rod being positioned adjacent the junction between said housing and said grip.

* * * * *